United States Patent
Omar et al.

(10) Patent No.: US 8,346,690 B2
(45) Date of Patent: Jan. 1, 2013

(54) METHOD OF GENERATING AN INTEGRATED FUZZY-BASED GUIDANCE LAW USING TABU SEARCH

(75) Inventors: Hanafy M. Omar, Dhahran (SA); M. A. Abido, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 251 days.

(21) Appl. No.: 12/851,474

(22) Filed: Aug. 5, 2010

(65) Prior Publication Data

US 2012/0036095 A1 Feb. 9, 2012

(51) Int. Cl.
*G06F 15/18* (2006.01)
(52) U.S. Cl. .......................................................... 706/14
(58) Field of Classification Search ...................... 706/14
See application file for complete search history.

(56) References Cited

U.S. PATENT DOCUMENTS

| | | | |
|---|---|---|---|
| 6,629,085 B1 | 9/2003 | Krogmann | |
| 7,383,236 B2 | 6/2008 | Jin et al. | |
| 7,487,933 B1 | 2/2009 | Chen et al. | |
| 7,536,364 B2 | 5/2009 | Subbu et al. | |
| 7,660,651 B2 | 2/2010 | Zhong | |
| 7,664,622 B2 | 2/2010 | Ruetsch | |
| 2009/0177339 A1 | 7/2009 | Chen et al. | |

FOREIGN PATENT DOCUMENTS

| | | |
|---|---|---|
| CN | 1734238 (A) | 2/2006 |
| JP | 3020597 (A) | 1/1991 |
| JP | 9236400 (A) | 9/1997 |
| JP | 2001194097 (A) | 7/2001 |
| JP | 2005316614 (A) | 11/2005 |
| JP | 2009099051 (A) | 5/2009 |

*Primary Examiner* — Kakali Chaki
*Assistant Examiner* — Ababacar Seck
(74) *Attorney, Agent, or Firm* — Richard C. Litman

(57) ABSTRACT

The present invention relates to the generation of an integrated guidance law for aerodynamic missiles. Particularly, a Tabu search-based approach is utilized for generating an integrated fuzzy guidance law, which includes three separate fuzzy controllers. Each of these fuzzy controllers is activated in a unique region of missile interception. The method includes the following steps: establishing a missile guidance law $f(z)$, where z represents a vector containing fuzzy membership functions and guidance rules associated with the missile guidance law; and optimizing the missile launch guidance law $f(z)$ by minimizing the equation $$f(z) = w_1 t_f + w_2 \int_0^{t_f} a_m^2 dt + w_3 |r(t_f)|,$$

where $t_f$ represents missile interception time, r represents a distance between the missile and a target, $w_1$, $w_2$ and $w_3$ are weighting factors, and $a_m$ represents a missile normal acceleration, and further $|r(t_f)| < r_{miss-allowed}$, where $r_{miss-allowed}$ represents a pre-selected allowable miss distance, and the minimization is performed by Tabu search.

6 Claims, 10 Drawing Sheets

METHOD OF GENERATING AN INTEGRATED FUZZY-BASED GUIDANCE LAW USING TABU SEARCH

BACKGROUND OF THE INVENTION

1. Field of the Invention

The present invention relates to guidance systems for surface-to-air missiles, and particularly to a method of generating an integrated guidance law that uses an optimization-based approach and a Tabu search to determine the initial feasible solution for the algorithm to select between one of three fuzzy controllers implementing different guidance laws to issue a guidance command to the missile.

2. Description of the Related Art

Guidance technology of missiles includes many well-known guidance laws, which are regularly utilized. The guidance and control laws typically used in current tactical missiles are mainly based on classical control design techniques. These conventional control approaches, however, are often not sufficient to obtain accurate tracking and interception of a missile. Therefore, advanced control theory must be applied to a missile guidance and control system in order to improve its performance. Fuzzy control has suitable properties to eliminate such difficulties. However, at the present time, there is very limited research related to fuzzy missile guidance design.

Fuzzy logic has been applied to change the gain of the proportional navigation guidance (PNG) law. Such a fuzzy-based controller was also used in the design of guidance laws where the line of sight (LOS) angle and change of LOS angle rate are used as input linguistic variables, and the lateral acceleration command can be used as the output linguistic variable for the fuzzy guidance scheme. It is known that these fuzzy guidance schemes perform better than traditional proportional navigation or augmented proportional navigation schemes; i.e., these methods result in smaller miss distances and lower acceleration commands.

In the above, though, the parameters of the fuzzy guidance law are generated by trial and error, which consumes time and effort, as well as computational power, and the results are not necessarily optimal. Moreover, such conventional methods and systems use only one type of guidance through the entire interception range. Each of the classical guidance laws has a particular region of operation in which they are found to be superior to other guidance laws.

It would be desirable to make such methodologies more efficient through the usage of a systematic technique to get the initial feasible solution, such as through use of a Tabu search (TS). TS is a higher level heuristic algorithm for solving combinatorial optimization problems. It is an iterative improvement procedure, which starts from any initial solution and attempts to determine a better solution. TS has recently become a well-established optimization approach that is rapidly spreading to a variety of fields.

Generally, TS is characterized by its ability to avoid entrapment in local optimal solution and prevent cycling by using flexible memory of search history. It has been shown that, under certain conditions, the TS can yield global optimal solutions with probabilities equal to one. TS is used to optimize a performance index based on input/output relationships only. Thus, only minimal knowledge of the plant under investigation is required. In addition, because derivative information is not needed in the execution of the algorithm, many pitfalls that gradient search methods suffer can be overcome. Recently, Tabu search has been applied to a wide variety of engineering optimization problems with great success Referring to actual missile guidance and control, we assume for the sake of simplicity that a missile's motion is constrained in the vertical plane. Furthermore, the missile may be modeled as a point mass with aerodynamic forces applied at the center of gravity. Thus, from the missile's balanced forces, shown in FIG. 2, the equations of motion for the missile can be written as:

$$\dot{\gamma}_m = \frac{(L + T\sin\alpha)}{mV_m} - \frac{g\cos\gamma_m}{V_m} \tag{1a}$$

$$\dot{V}_m = \frac{(T\cos\alpha - D)}{m} - g\sin\gamma_m \tag{1b}$$

$$\dot{x}_m = V_m \cos\gamma_m \tag{1c}$$

$$\dot{h}_m = V_m \sin\gamma_m \tag{1d}$$

$$L = \frac{1}{2}\rho V_m^2 S_{ref} C_L \tag{1e}$$

$$C_L = C_{L\alpha}(\alpha - \alpha_o) \tag{1f}$$

$$D = \frac{1}{2}\rho V_m^2 S_{ref} C_D \tag{1g}$$

$$C_D = C_{Do} + kC_L^2 \tag{1h}$$

where L, D, and T represent the lift, drag and thrust forces acting on the missile, respectively, $\rho$ is the air density, $S_{ref}$ is the reference surface area, $\gamma_m$ represents the missile heading angle, $\alpha$ represents the missile angle of attack, m represents the missile mass, $V_m$ represents the missile velocity, g is the gravitational acceleration, $x_m$ and $h_m$ are the horizontal and vertical positions of the missile, respectively, $C_L$ represents the lift coefficient, and $C_D$ represents the drag coefficient.

The aerodynamic derivatives $C_{L\alpha}$, $C_{D0}$ and k are given as functions of the Mach number M, while the thrust and the mass are functions of time. The angle of attack $\alpha$ is used as the control variable and the missile normal acceleration can be determined from:

$$a_m = \dot{\gamma}_m V_m = \frac{(L + T\sin\alpha)}{m} - g\cos\gamma_m \tag{2}$$

where the target is assumed to be a point mass with a constant velocity $V_t$ and acceleration $a_t$. The direction and position of the target in the horizontal and vertical directions are determined from the following relations:

$$\dot{\gamma}_t = \frac{a_t}{V_t} \tag{3a}$$

$$\dot{x}_t = V_t \cos\gamma_t \tag{3b}$$

$$\dot{h}_t = V_t \sin\gamma_t. \tag{3c}$$

From the interception geometry shown in FIG. 3, the line of sight angle rate and the derivative of the relative distance between the missile and the target can be written as:

$$\dot{\theta}(V_m \sin(\theta - \gamma_m) - V_t \sin(\theta - \gamma_t))/r \tag{4a}$$

$$\dot{r} = -V_m \cos(\theta - \gamma_m) + V_t \cos(\theta - \gamma_t) \tag{4b}$$

In the above, $\theta$ represents the line of sight angle, r represents the distance between the missile and the target, and $V_t$ represents the target velocity. For any surface-to-air missile, there are three guidance phases. The first phase of the trajectory is called the "launch" or "boost" phase, which occurs for a relatively short time. The function of the launch phase is to take the missile away from the launcher base. At the completion of this phase, midcourse guidance is initiated. The function of the midcourse guidance phase is to bring the missile near to the target in a short time. The last few seconds of the engagement constitute the terminal guidance phase, which is the most crucial phase, since its success or failure determines the success or failure of the entire mission.

There are two basic guidance laws governing homing missiles: Pursuit Guidance (PG) and the Proportional Navigation Guidance (PNG). PG guides the missile to the current position of the target, whereas PNG orientates the missile to an estimated interception point. Therefore, PNG has smaller interception time than PG, but this method may show unstable behavior for excessive values of the navigation constant. Thus, it is recommended to use PNG in the launching phase in order to get the fastest heading to the target, since stability is not a relatively large problem in this stage, while using PG in the terminal phase.

Since PNG is used during the boost phase to direct the missile velocity to the predicted interception location, the missile velocity should be aligned with the predicted interception velocity. Therefore, the missile command should be a function of a velocity error angle σ and its derivative. In the terminal phase, the position error dominates the final miss distance, thus it is recommended to use PG. The missile command must thusly be a function of the heading error δ in order to have a stable system with a minimum miss distance. During the midcourse phase, it is hoped that the missile reaches the terminal phase with the highest speed for the greatest distance possible and, at the same time, with a minimal heading error. Thus, the missile acceleration is a function of both variables.

The estimated value of the angle of this direction $\gamma_p$ can be obtained directly from the interception geometry in FIG. 3 as:

$$\gamma_p = \theta - \alpha\tan\left(\frac{V_T t_p \sin(\phi)}{r + V_T t_p \cos(\phi)}\right). \quad (5)$$

The derivative of this angle is:

$$\dot{\gamma}_p = \dot{\theta} - \frac{V_T t_p[-\dot{r}\sin\varphi + \dot{\varphi}(V_T t_p + r\cos\varphi)]}{(V_T t_p)^2 + 2rV_T t_p\cos\varphi + r^2} \quad (6)$$

where $t_p$ is the predicted time to intercept the target, which can be simply estimated as:

$$t_p \approx -\frac{r}{\dot{r}}. \quad (7)$$

As will be discussed in greater detail below, a is a variable defining the distribution of the membership function. It would be desirable to utilize the efficient Tabu search in order to generate missile guidance laws without requiring start points found via trial and error. Thus, a method of generating an integrated fuzzy-based guidance law solving the aforementioned problems is desired.

SUMMARY OF THE INVENTION

The method for generating an integrated fuzzy-based guidance law applies to aerodynamic missiles, and particularly to surface-to-air missiles. Particularly, a Tabu search-based approach is utilized for generating an integrated fuzzy guidance law, which includes three separate fuzzy controllers. Each of these fuzzy controllers is activated in a unique region of missile interception to provide commands to the missile guidance system.

The method includes the following steps: (a) establishing a missile guidance law $f(z)$, where z represents a vector containing fuzzy membership functions and guidance rules associated with the missile guidance law; and (b) optimizing the missile launch guidance law $f(z)$ by minimizing the equation $$f(z) = w_1 t_f + w_2 \int_0^{t_f} a_m^2 dt + w_3 |r(t_f)|,$$

where $t_f$ represents missile interception time, r represents a distance between the missile and a target, $w_1$, $w_2$ and $w_3$ are weighting factors, and $a_m$ represents a missile normal acceleration, and further $|r(t_f)| > r_{miss-allowed}$, where $r_{miss-allowed}$ represents a pre-selected allowable miss distance, and the minimization is performed by Tabu search.

These and other features of the present invention will become readily apparent upon further review of the following specification and drawings.

These and other features of the present invention will become readily apparent upon further review of the following specification and drawings.

DETAILED DESCRIPTION OF THE PREFERRED EMBODIMENTS

Figure 1:
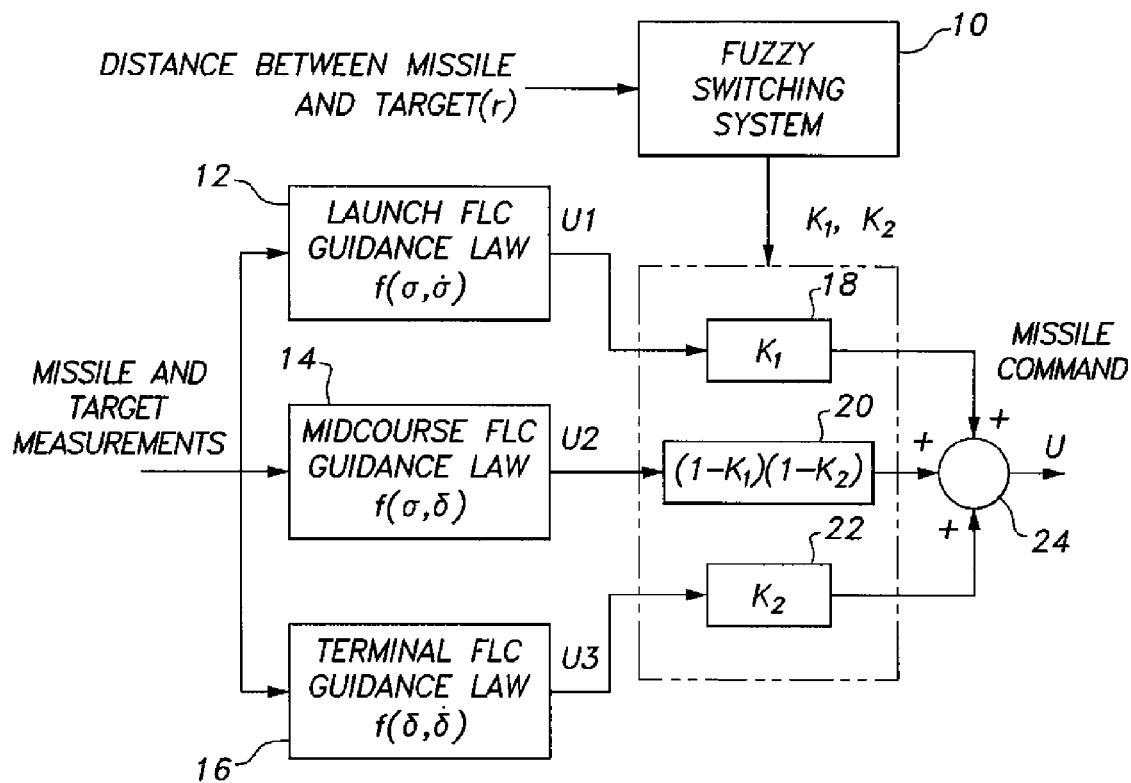
FIG. 1 is a block diagram of a system implementing the method of generating an integrated fuzzy-based guidance law according to the present invention.
Figure 2:
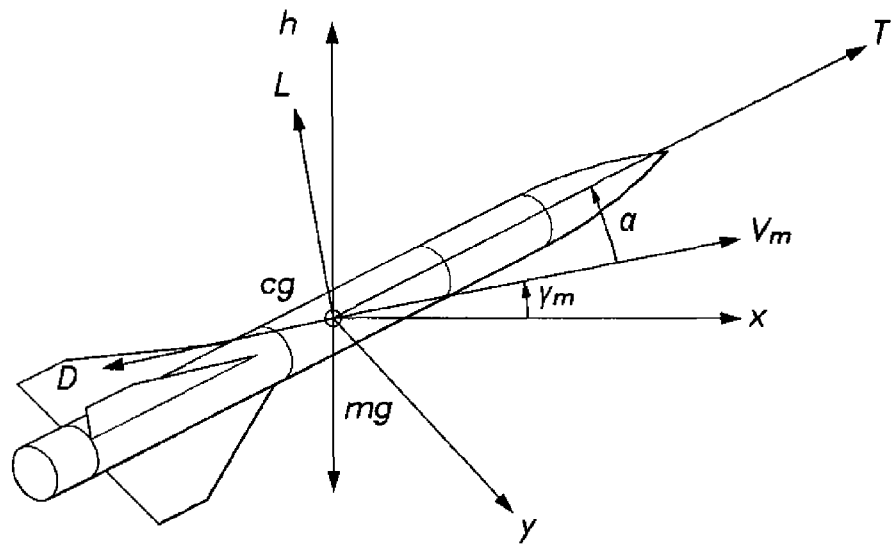
FIG. 2 is a diagram of a missile illustrating the variables typically utilized in aerodynamic missile guidance laws.
Figure 3:
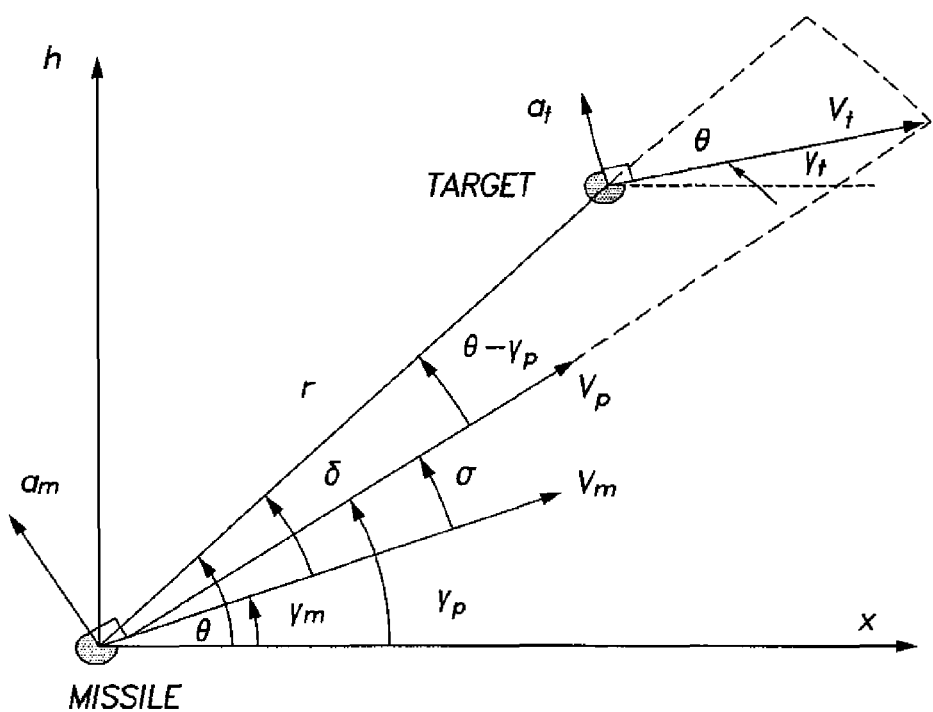
FIG. 3 is a diagram illustrating typical interception geometry for aerodynamic missiles.

FIG. 1 diagrammatically illustrates an overview of the integrated guidance law generated by the present method of generating an integrated fuzzy-based guidance law. The method utilizes three separate fuzzy-based guidance laws for the launch, mid-course and terminal phases, respectively. In FIG. 1, the launch fuzzy law controller (FLC) is shown as block 12, the midcourse FLC is shown as block 14, and the terminal FLC is shown as block 16. A fuzzy switching controller 10, with two gains, is used to provide smooth transitioning between the three separate guidance laws 12, 14, 16. These switching gains are determined from the following fuzzy rules:

If r is Big (B) then $K_1$=1 and $K_2$=0(launch phase)  (8a)

If r is Medium (M) then $K_1$=0 and $K_2$=0(Midcourse phase)  (8b)

If r is Small (S) then $K_1$=0 and $K_2$=1(Terminal Phase)  (8c)

Figure 4:
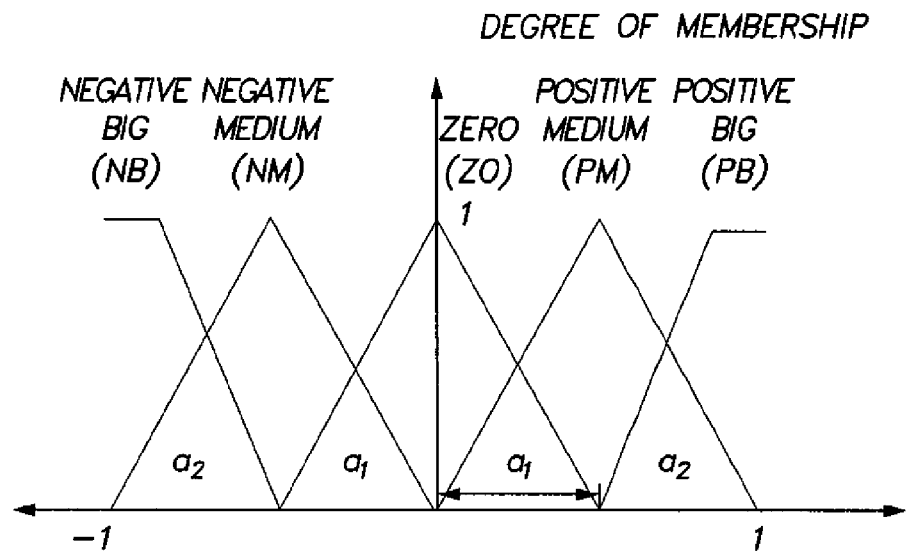
FIG. 4 is a chart illustrating typical normalized membership functions utilized in the method of generating an integrated fuzzy-based guidance law according to the present invention.

The fuzzy controller 10 has three main components: scaling factors, membership functions and rules. The initial point in the generation of the fuzzy guidance law is to choose numbers and shapes of membership functions (MFs) for input and output variables. In the following, MFs with triangular shapes are chosen for all input and output variables, as illustrated in FIG. 4. All of the variables have positive and negative values, except for the range, which is solely positive. Thus, only three MFs are used for the range and five MFs are used for the other variables.

The second step in the generation is to determine the scaling factors that convert the physical ranges of the fuzzy variables into the normalized ranges between −1 and 1. The scaling factors can be determined from the expected maximum values of the controller's variables, which are typically obtained from the engineering data regarding the particular missile's dynamics.

In order to complete the definition of the fuzzy guidance law, the rules which define the relationship between the control action and missile-target measurements should be determined. At the first stage of the design process, equally distributed MFs (i.e., $a_1$=$a_2$=½) with the rules obtained from imitating the behavior of a Proportional-Derivative (PD) controller can be used for the three guidance laws, since all of these laws have the same form as the PD controller. The general PD controller law can be written as:

$$u=K_p e+K_d \dot{e}$$  (9)

These rules can be derived easily by observing that the output is the summation of error e and the error derivative ė, which are shown below in Table 1:

TABLE 1

PD-Fuzzy Rules

| u | | | ė | | |
|---|---|---|---|---|---|
| e | NB | NS | ZO | PS | PB |
| NB | NB | NB | NS | NS | ZO |
| NS | NB | NS | NS | ZO | PS |
| ZO | NS | NS | ZO | PS | PS |
| PS | NS | ZO | PS | PS | PB |
| PB | ZO | PS | PS | PB | PB |

The next step is to optimally tune these MFs and rules obtained from the first stage to obtain the final results. To include the linguistic rules in the optimization process, an integer encoding system is used to refer to the output fuzzy variables, as shown below in Table 2:

TABLE 2

Encoding System for the FLC Output

| MF | NB | NS | ZO | PS | PB |
|---|---|---|---|---|---|
| Code | 1 | 2 | 3 | 4 | 5 |

In FIG. 1, the launch FLC guidance law 12 is shown as a function $f(\sigma, \dot{\sigma})$ or, in other words, as a function of the velocity error angle and its time derivative. The midcourse guidance law 14 is shown as a function $f(\sigma, \delta)$, or as a function of the error angle and the heading error. Missile and target measurements are used as an input for $f(\sigma, \delta)$. Similarly, the terminal FLC guidance law 16 is given as a function $f(\delta, \dot{\delta})$ or, in other words, as a function of the heading error and its time derivative.

The two gains of the fuzzy switching system 10 $K_1$, $K_2$ are, respectively, the output of launch FLC guidance law 12 and terminal FLC guidance law 16 (following output paths $u_1$ and $u_3$ to blocks 18, 22, respectively, in FIG. 1). The output of the midcourse FLC guidance law 14 (following path $u_2$ to block 20 in FIG. 1) is a function of $K_1$ and $K_2$, namely, (1−$K_1$)(1−$K_2$). The input to the fuzzy switching controller 10 is the distance between the missile and the target r, and the ultimate output u is the missile guidance command.

Figure 5:
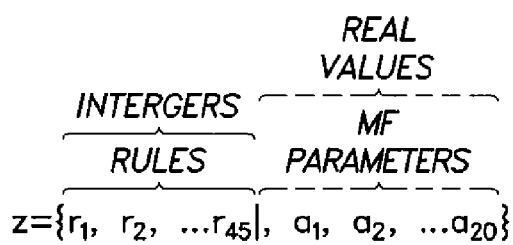
FIG. 5 is a chart illustrating a typical structure of a genetic algorithm individual.

The goal of the optimization problem is to find or tune the existing consequents of the FLC rules and MF parameters in order to minimize a performance index, which is a function of interception time, the missile acceleration commands, and the miss distance. In order to optimally find or tune the fuzzy parameters, the optimization problem can be formulated as follows:

$$\min f(z) = w_1 t_f + w_2 \int_0^{t_f} a_m^2 dt + w_3 |r(t_f)|, \qquad (10)$$

subject to the condition $|r(t_f)| > r_{miss-allowed}$. In the above, $t_f$ is the interception time, $w_1$, $w_2$ and $w_3$ are weighting factors, $r_{miss-allowed}$ is the allowed miss distance, and z is a vector that contains the unknown parameters of the fuzzy guidance law (i.e., MFs and rules), as illustrated in FIG. 5. The rules are denoted by $r_n$, which can take only integer numbers between 1 and 5, according to the code shown in Table 2. The variables a that define the distribution of the membership function are real, with a range between 0 and 1.0, as shown in FIG. 4. In this problem, 45 rules and 20 variables define the MFs distributions (with the assumption that missile acceleration is defined by an odd function).

The scaling factors are chosen such that $w_1$ and $w_2$ have fixed values while $w_3$ is defined with two levels, as shown in equation (10), to convert the constraint problem into a non-constraint problem:

$$w_3 = \begin{cases} w_m; 0 \leq r(t_f) \leq R_{miss-allowed} \\ 100 w_m; r(t_f) > R_{miss-allowed}. \end{cases} \qquad (11)$$

The Tabu search technique is used to solve the above large scale constrained optimization problem in order to find the best solution. In this problem, the solution contains two types of data: integer numbers for the rules consequents, and real numbers for the parameters that describe the distribution of MFs. The Tabu search is a well known mathematical optimization method, belonging to the class of local search techniques. Tabu search enhances the performance of a local search method by using memory structures; i.e., once a potential solution has been determined, it is marked as "taboo" ("tabu" being a different spelling of the same word) so that the algorithm does not visit that possibility repeatedly.

The basic elements of the Tabu search include: current solution, moves, the set of candidate moves, Tabu restrictions, the aspiration criterion, and the stopping criteria. The current solution (commonly symbolized as "xcurrent") is a set of the optimized parameter values at any iteration. The current solution, or xcurrent, plays a central role in generating the neighbor trial solutions. The moves characterize the process of generating trial solutions that are related to xcurrent.

The set of candidate moves [commonly symbolized as "N(xcurrent)"] is the set of all possible moves or trial solutions ("xtrials") in the neighborhood of xcurrent. The Tabu restrictions are certain conditions imposed on moves that make some of them forbidden. These forbidden moves are listed to a certain size and are known as "tabu". This list is called the "tabu list". The reason behind classifying a certain move as forbidden is, essentially, to prevent cycling and avoid returning to the local optimum just visited. The tabu list size plays a large role in the search of high quality solutions. Generally, the tabu list size should grow with the size of the given problem. In the present method, a tabu list size of 10 is found to be quite satisfactory.

The aspiration criterion (or "level") is a rule that overrides tabu restrictions; i.e., if a certain move is forbidden by a tabu restriction, the aspiration criterion, when satisfied, can make this move allowable. A number of different forms of aspiration criteria are used in the literature. The aspiration criterion used in the present method is the overriding of the tabu status of a move if this move yields a solution which has a better objective function $f$ than the one obtained earlier with the same move.

The stopping criteria are the conditions under which the search process will terminate. In the present method, the search will terminate if one of the following criteria is satisfied: the number of iterations since the last change of the best solution is greater than a pre-specified number; or the number of iterations reaches the maximum allowable number.

The general Tabu search algorithm is given by the following steps: (a) Set the iteration counter k=0 and randomly generate an initial solution xinitial, and set this solution as the current solution as well as the best solution xbest; i.e., xinitial=xcurrent=xbest (steps 200, 202, 204 and 206 in FIG. 7); (b) randomly generate a set of trial solutions xtrials in the neighborhood of the current solution; i.e., create S(xcurrent). Sort the elements of S based on their objective function values in ascending order since the problem is a minimization problem. Define xtriali as the i-th trial solution in the sorted set $1 \leq i \leq nt$. Here, xtrial1 represents the best trial solution in S in terms of the objective function value associated with it (step 208).

The algorithm continues with the step: (c) set i=1. If J(xtriali)>J(xbest), then proceed to step (d) (step 210); otherwise, set xbest=xtriali (step 212) and proceed to step (d); (d) check the tabu status of xtriali (step 214). If the tabu status of xtriali is not in the tabu list, then put it in the tabu list, set xcurrent=xtriali, and proceed to step (g) (step 216). If it is in the tabu list, then proceed to step (e); (e) check the aspiration criterion of xtriali (step 220). If the aspiration criterion of xtriali is satisfied, then override the tabu restrictions, update the aspiration level, set xcurrent=xtriali, and proceed to step (g) (step 222). If not, then set i=i+1 and proceed to step (f) (step 218).

Next, the algorithm proceeds with step (f) If i>nt then proceed to step g) (step 224), otherwise return to step (d); and (g) check the stopping criteria (step 226). If one of the stopping criteria is satisfied, then stop (step 230). Otherwise, set k=k+1 (step 228) and return to step (b).

Figure 6:
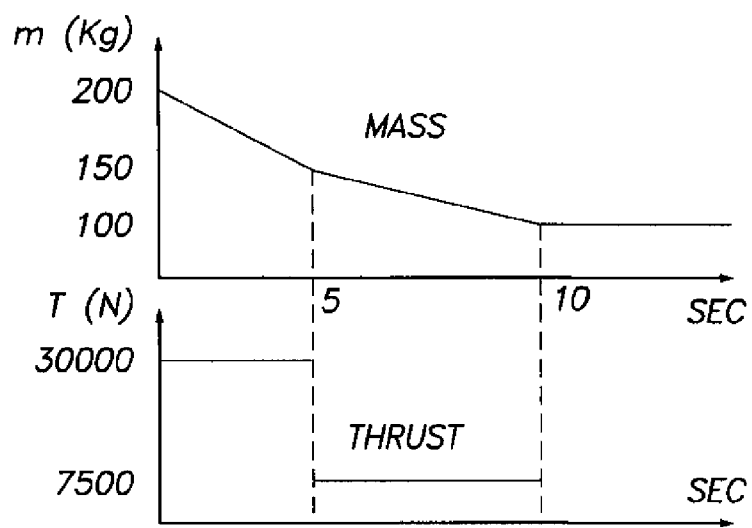
FIG. 6 is a graph illustrating an exemplary time history of missile mass and thrust.

In order to test the accuracy of the present method, an exemplary missile, with a corresponding set of missile parameters, is introduced. For purposes of modeling and simulation, it is assumed that the missile under consideration has thrust and mass that vary with time, as shown in FIG. 6, while the other parameters are given as:

$$C_{L\alpha}=2.9+0.3\ M^2+0.01\ M^3, \alpha_o=0$$

$$C_{Do}=0.45-0.01\ M, k=0.06, S_{ref}=0.08 \quad (12)$$

and the allowed miss distance is set to 2.0 m. The initial values for the missile variables are:

$$v_m=10\ m/s, \gamma_m=30°, r=5000\ m \quad (13)$$

The maximum allowed ranges for the fuzzy input and output variables can be estimated as:

$$\alpha_{max}=20°, \delta_{max}=\sigma_{max}=20° \quad (18)$$

$$\delta_{max}=\sigma_{max}=\frac{a_{max}}{600} \approx 28.6\ deg/sec$$

and the target is assumed to have a constant speed of 400 msec with a constant acceleration of 3G (G=9.8 m/sec²). The initial values for the missile and target variables are:

$$v_m=10\ m/s, \gamma_m=30°, r=5000\ m$$

$$\theta=50°, \gamma_t=0 \quad (19)$$

and the simulation is performed using a variable step solver.

The weighting factors in the optimization function are chosen as:

$$w_1=1; w_2=10^{-4}; w_m=10. \quad (20)$$

The simulation stops when the closing velocity becomes positive. The time and the relative distance at that instant are the final interception time and the miss distance, respectively.

Figure 7:
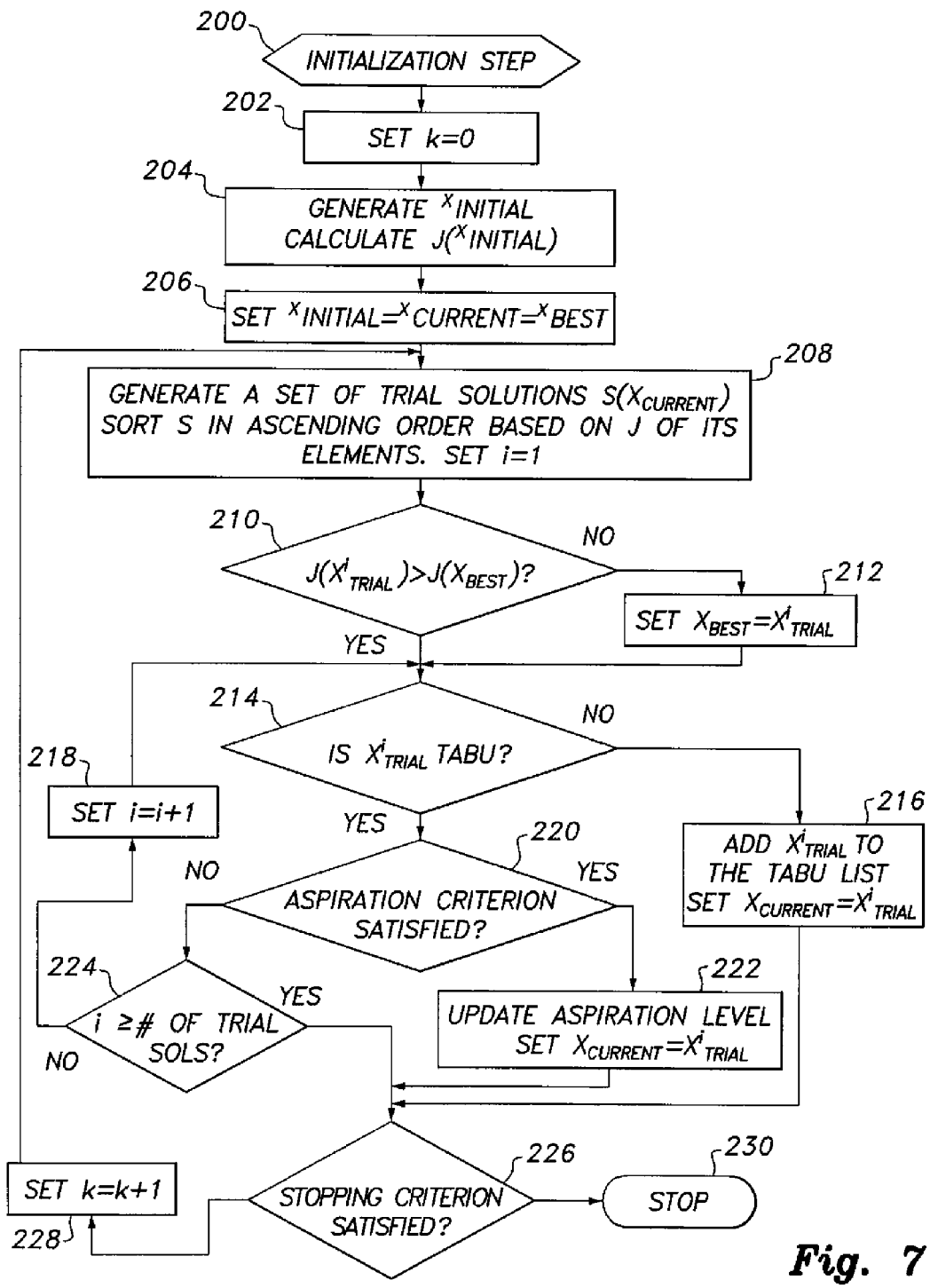
FIG. 7 is a flowchart illustrating the steps of a conventional Tabu search algorithm.

The Tabu search algorithm is executed as in the flow diagram shown in FIG. 7. The size of the tabu list and the neighborhood is set to 10. The allowable difference in rules and the MFs is 2 and ⅓, respectively. The Tabu search optimization algorithm is run for three separate cases, based on the choice of the initial solution: The first case is with learning, where the initial solution is chosen such that all three fuzzy controllers for the launch, midcourse, and terminal phases have the PD-fuzzy rules with equally distributed MFs for all of the fuzzy inputs and outputs including the range; the second case is without learning, where the initial solution is chosen randomly; and the third case uses MF optimization only, where the optimization is carried out only on the MFs, while the rules for the three FLCs are chosen to be the classical PD-fuzzy rules.

Figure 8:
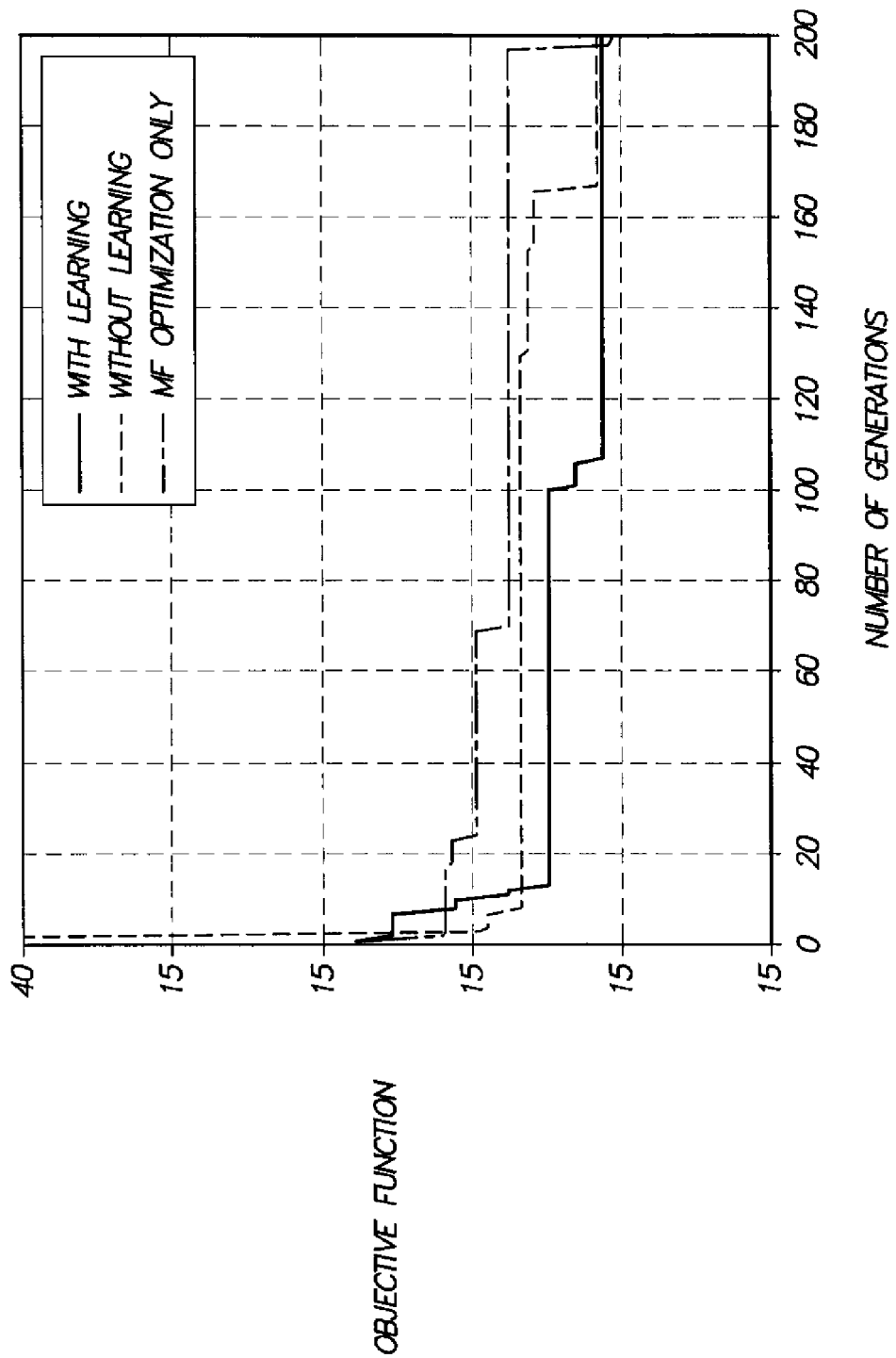
FIG. 8 illustrates a graph comparing the tabu search algorithm of FIG. 7 operating on the sample data of FIG. 6 for three cases differing in the choice of initial solution, showing after 200 generations convergence of the guidance law objective function, but with abrupt transitions.

The best objective function at each generation for the three cases is shown in FIG. 8. As expected, starting with a strong solution helps the TS to converge faster than if the algorithm starts with a randomly selected solution. In the second case and the third case, the initial objective function has a relatively small value, which indicates that the initial solution for these cases is a feasible solution that satisfies the constraint imposed on the miss distance. The opposite is true for the second case. With the progress of the search algorithms, the three cases give (after 200 generations) nearly the same value.

Due to the stochastic behavior of the search algorithm, there is observed some abrupt changes in the objective function.

Figure 9:
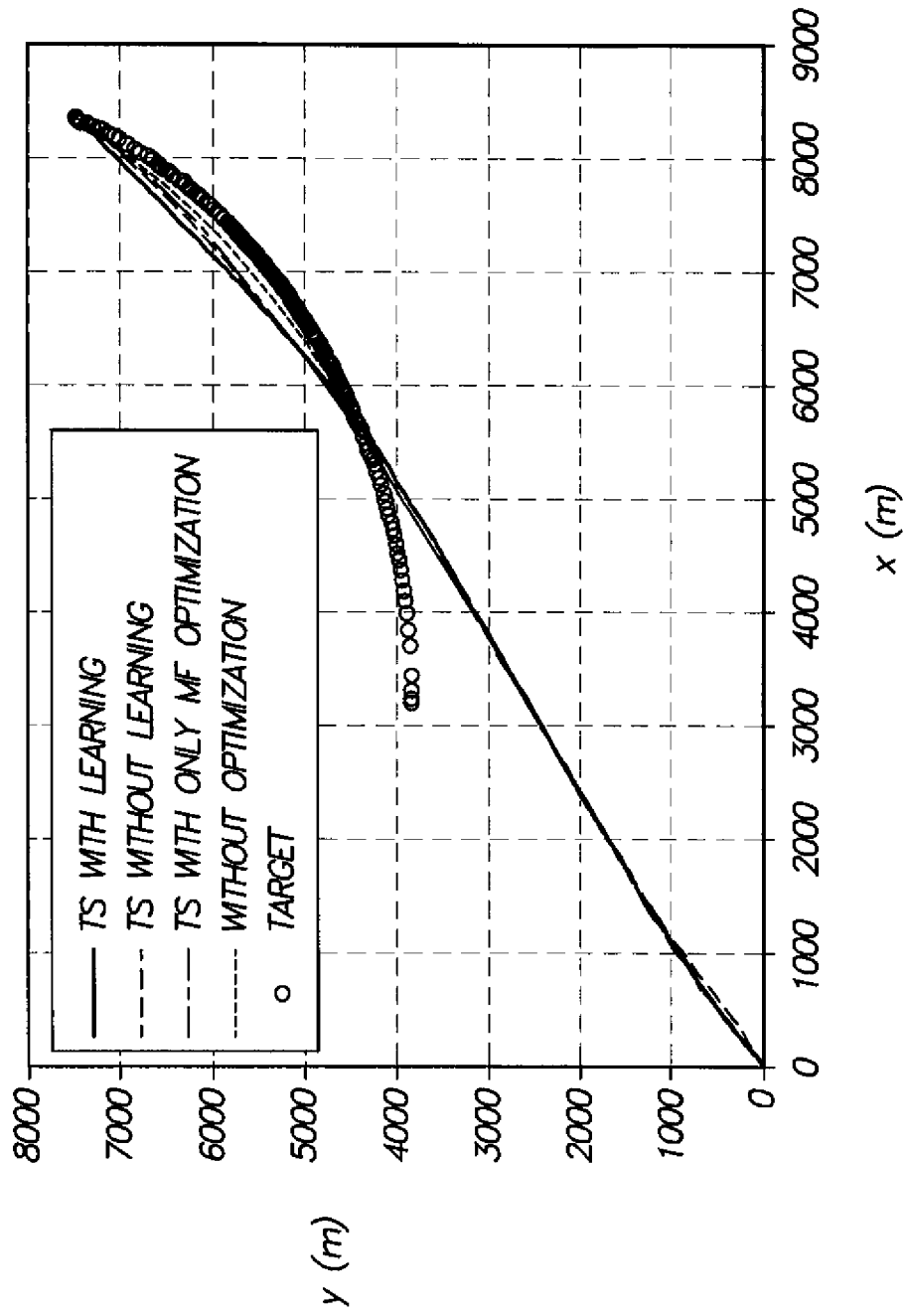
FIG. 9 is a comparison graph illustrating exemplary time history of the interception of a maneuvering target.

FIG. 9 illustrates the time history of the interception variables due to the implementations of the best guidance laws obtained from the three cases noted above beside a fourth, where the classical PD-fuzzy rules with equally distributed MFs are used for the generated integrated fuzzy-based guidance law (IFGL). This fourth case represents a guidance that is designed from engineering experience and experimental data alone, without optimization. Table 3 below shows the values of the final interception time, miss distance, and consumed acceleration commands recorded for the four cases:

TABLE 3

Performance Indices for IPFGL With Tabu Search

| Case | Interception time $t_f$ (sec) | Miss distance (m) | Acceleration $10^{-4} \times \int_0^{t_f} a_m^2 dt$ |
|---|---|---|---|
| TS without learning | 16.609 | 0 | 3.929 |
| TS with learning | 17.114 | 0 | 4.0761 |
| Optimizing MF only | 16.66 | 0.012436 | 3.4201 |
| Without optimization | 16.7978 | 0.7343 | 10.9486 |

From these results, it can be observed that the interception time for the three cases is nearly the same for all cases. However, the lowest value is recorded for the first case, in which prior knowledge is utilized to select the rules and the distribution of MFs. The fourth case, which depends only on engineering experience, has the largest miss distance and consumed energy, due to the high level of acceleration commands. The third case, in which the optimization was performed on MFs only, has the lowest consumed energy due to two factors: the low level of acceleration commands and the smoothness of these commands.

Figure 10:
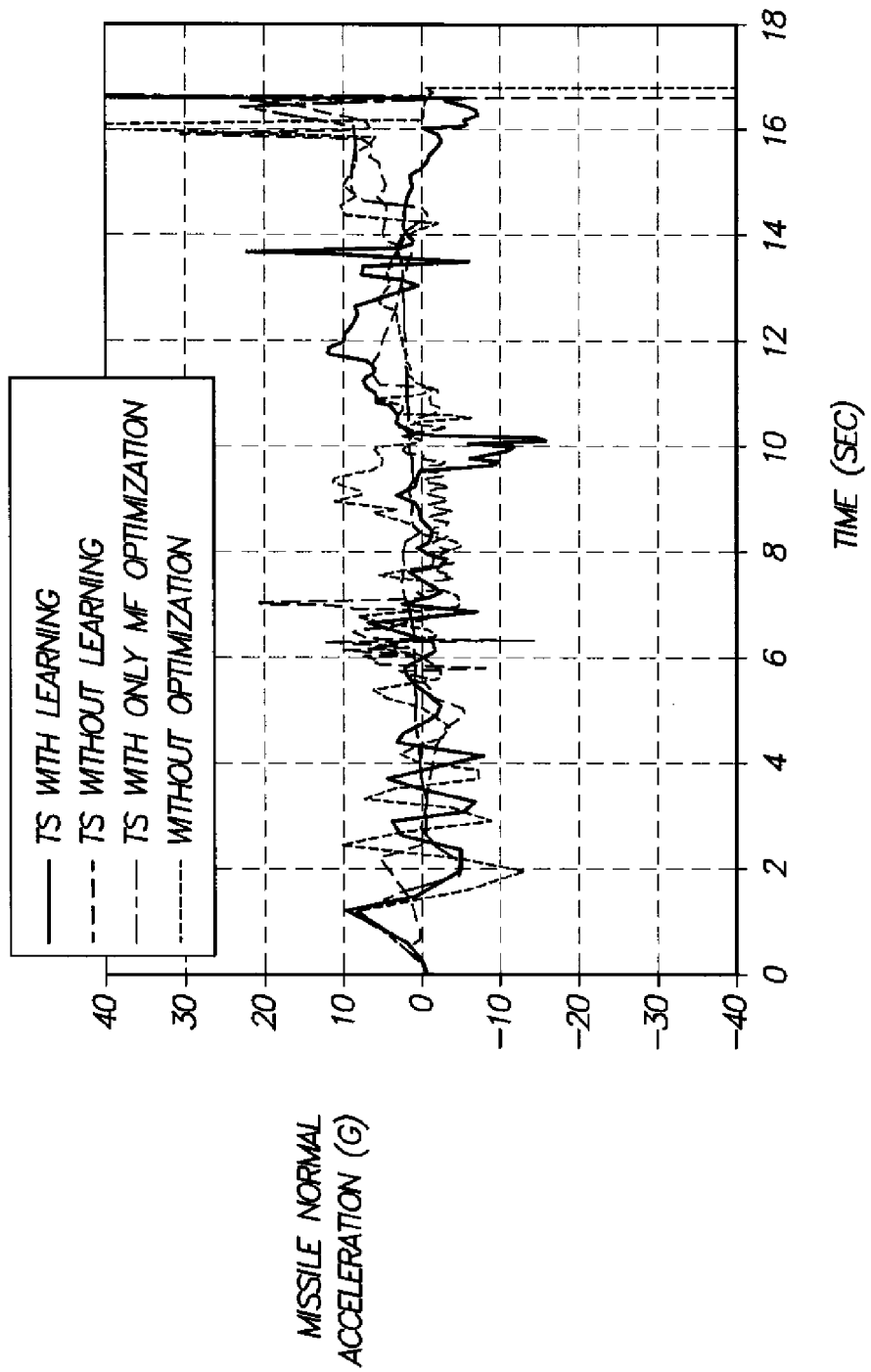
FIG. 10 is a comparison graph illustrating exemplary time history of missile acceleration.
Figures 11A, 11B:
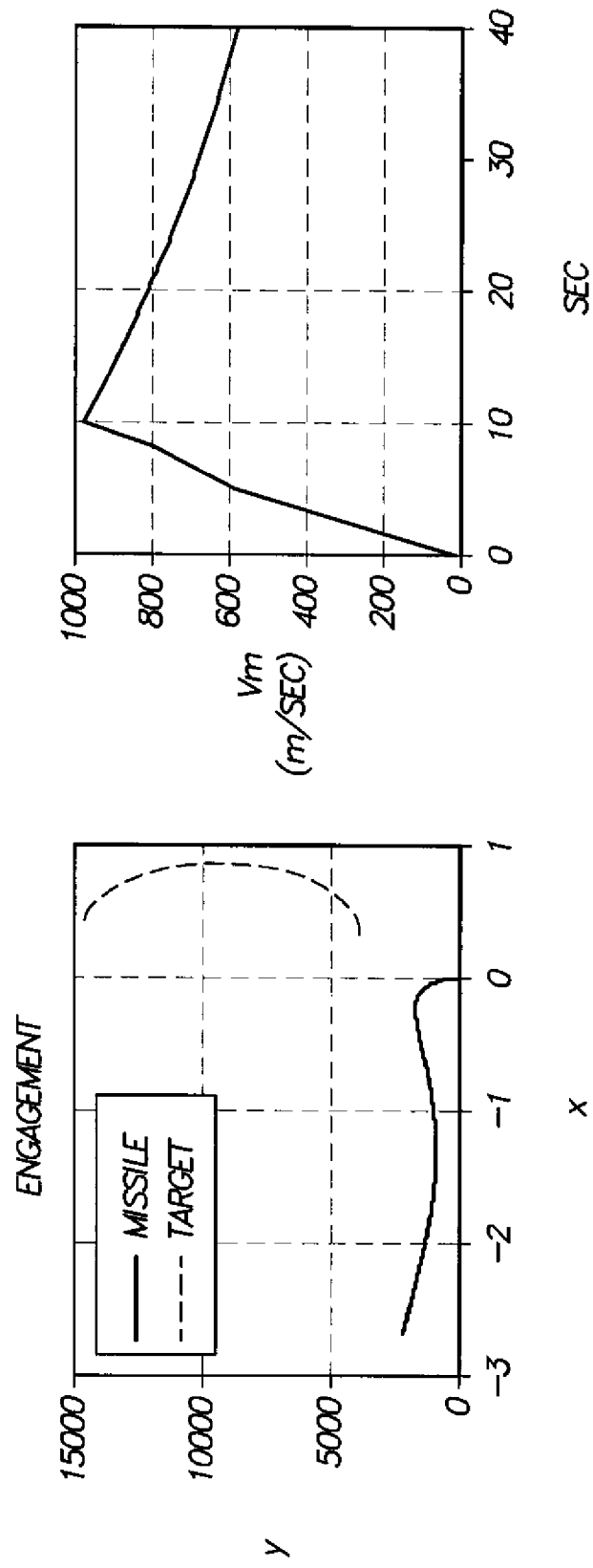
FIGS. 11A, 11B, 11C and 11D are graphs illustrating interception history using a conventional, classical proportional guidance law.
Figure 11D:
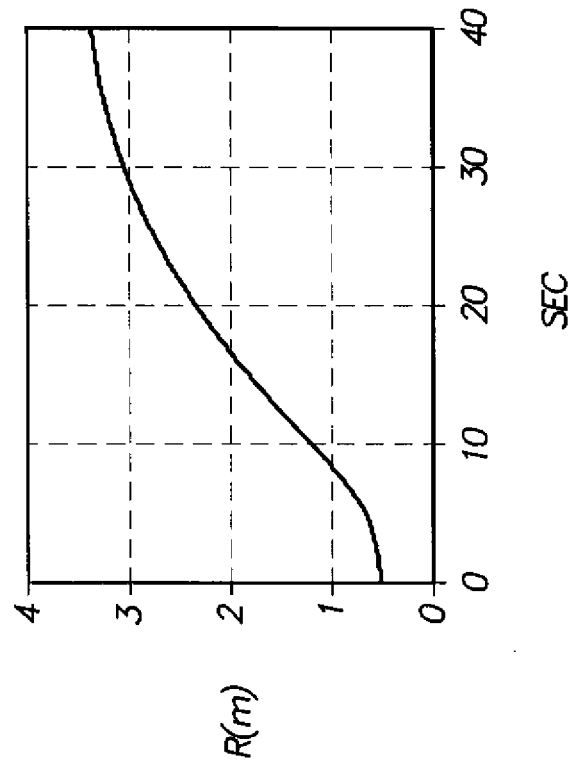
Figure 11C:
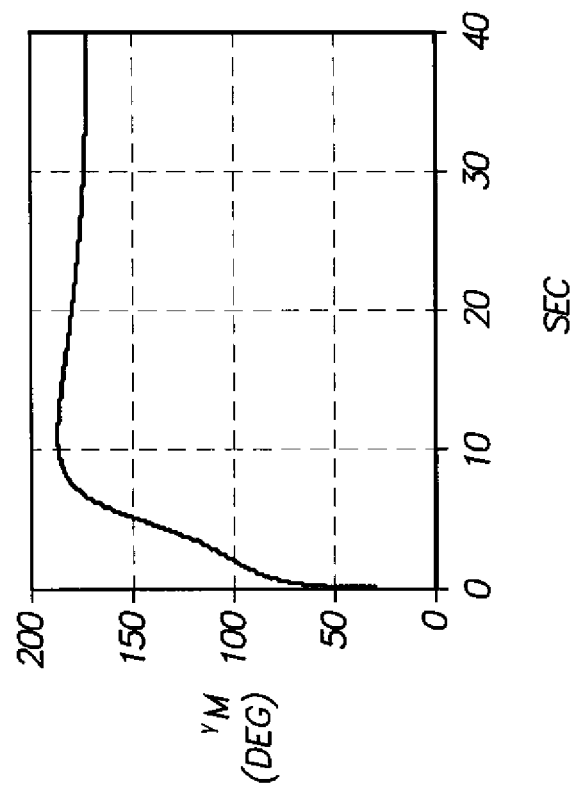

The missile acceleration command, shown in FIG. 10, is smoother for the third case, compared to the other cases, due to the use of the classical PD-fuzzy rules, in which the transition from rule to rule is smooth (i.e., from NB to NS and from NS to ZO). In contradistinction, an abrupt transition between the rules obtained from the optimization (i.e., NB to PB, etc.) is observed.

The generated IFGL, generated by the present method, has been compared with the classical proportional guidance law (PNG), given by:

$$a_m = -N_g \dot{\theta} \dot{r} \quad (21a)$$

$$\dot{\gamma}_m = \frac{a_m}{V_m} \quad (21b)$$

with the same conditions as the problem under consideration. The results of implementing PNG are shown in FIGS. 11A, 11B, 11C and 11D. It is apparent that, unlike the generated IFGL, PNG is not able to intercept the target. This can be attributed to the small value of the missile initial velocity. It can be seen that the missile is directed away from the target due to the high value of the flight path angle. These results confirm the greater accuracy of the IFGL generated by the present method over the proportional navigation guidance law.

The maneuvering target scenario that is used in the above is selected to demonstrate the effectiveness of the present method. However, the scenarios should be selected by the guidance engineer to cover the expected operating range of the missile under development. In this case, the total value of the objective function will be equal to the sum of the objective functions from all these scenarios.

The present method can be described with the following steps: (a) establishing a missile guidance law $f(z)$, where z represents a vector containing fuzzy membership functions and guidance rules associated with the missile guidance law; and (b) optimizing the missile launch guidance law $f(z)$ by minimizing the equation $$f(z) = w_1 t_f + w_2 \int_0^{t_f} a_m^2 dt + w_3 |r(t_f)|,$$

where $t_f$ represents missile interception time, r represents a distance between the missile and a target, $w_1$, $w_2$ and $w_3$ are weighting factors, and $a_m$ represents a missile normal acceleration, and further $|r(t_f)| < r_{miss-allowed}$, where $r_{miss-allowed}$ represents a pre-selected allowable miss distance, and the minimization is performed by Tabu search.

Further, the weighting factors $w_1$ and $w_2$ are selected to have fixed values and the weighting factor $w_3$ is preferably selected as $w_m$ when $0 \leq r(t_f) R_{miss-allowed}$, or the weighting factor $w_3$ is selected as 100 $w_m$ when $r(t_f) > R_{miss-allowed}$, where $w_m$ is a fixed missile weighting factor.

Figure 12:
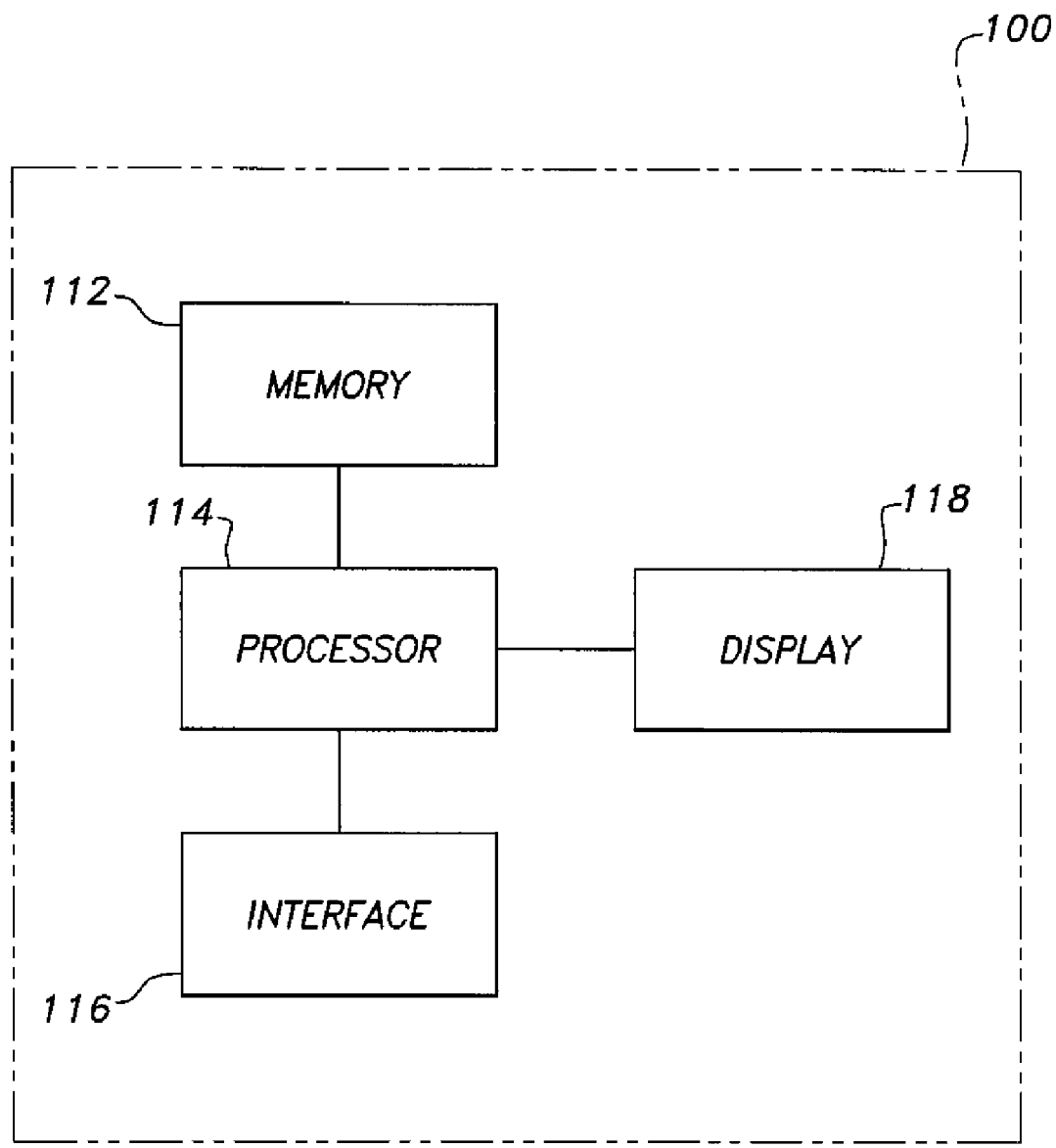
FIG. 12 is a block diagram illustrating system components for implementing the method of generating an integrated fuzzy-based guidance law according to the present invention.

It should be understood that the calculations may be performed by any suitable computer system, such as that diagrammatically shown in FIG. 12. Data is entered into system 100 via any suitable type of user interface 116, and may be stored in memory 112, which may be any suitable type of computer readable and programmable memory. Calculations are performed by processor 114, which may be any suitable type of computer processor and may be displayed to the user on display 118, which may be any suitable type of computer display.

Processor 114 may be associated with, or incorporated into, any suitable type of computing device, for example, a personal computer or a programmable logic controller. The display 118, the processor 114, the memory 112 and any associated computer readable recording media are in communication with one another by any suitable type of data bus, as is well known in the art.

Examples of computer-readable recording media include a magnetic recording apparatus, an optical disk, a magneto-optical disk, and/or a semiconductor memory (for example, RAM, ROM, etc.). Examples of magnetic recording apparatus that may be used in addition to memory 112, or in place of memory 112, include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

It is to be understood that the present invention is not limited to the embodiments described above, but encompasses any and all embodiments within the scope of the following claims.

We claim:

1. A computerized method of generating an integrated fuzzy-based guidance law, comprising the steps of:
   a) establishing a missile guidance law $f(z)$, wherein z represents a vector containing fuzzy membership functions and guidance rules associated with the missile guidance law;
   b) recording the missile launch guidance law $f(z)$ and the vector z in non-transitory computer readable memory;
   c) optimizing the missile launch guidance law $f(z)$ by minimizing the equation $$f(z) = w_1 t_f + w_2 \int_0^{t_f} a_m^2 dt + w_3 |r(t_f)|,$$

wherein $t_f$ represents missile interception time, r represents a distance between the missile and a target, $w_1$, $w_2$ and $w_3$ are weighting factors, and $a_m$ represents a missile normal acceleration, and further $|r(t_f)| < r_{miss-allowed}$, where $r_{miss-allowed}$ represents a pre-selected allowable miss distance, wherein the minimization is performed by Tabu search;
   d) recording the optimized missile launch guidance law $f(z)$ in the non-transitory computer readable memory; and
   e) displaying the missile launch guidance law $f(z)$ to a user.

2. The computerized method of generating an integrated fuzzy-based guidance law as recited in claim 1, wherein the weighting factors $w_1$ and $w_2$ are selected to have fixed values.

3. The computerized method of generating an integrated fuzzy-based guidance law as recited in claim 2, wherein the weighting factor $w_3$ is selected as $w_m$ when $0 \leq r(t_f) \leq R_{miss-allowed}$ and the weighting factor $w_3$ is selected as $100 w_m$ when $r(t_f) R_{miss-allowed}$, wherein $w_m$ is a fixed missile weighting factor.

4. A system for generating an integrated fuzzy-based guidance law, comprising:
   a processor;
   non-transitory computer readable memory coupled to the processor;
   a user interface coupled to the processor;
   a display;
   software stored in the memory and executable by the processor, the software:
      establishing a missile guidance law $f(z)$, wherein z represents a vector containing fuzzy membership functions and guidance rules associated with the missile guidance law;
      recording the missile guidance law $f(z)$, and the vector z in the non-transitory computer readable memory;
      optimizing the missile launch guidance law $f(z)$ by minimizing the equation $$f(z) = w_1 t_f + w_2 \int_0^{t_f} a_m^2 dt + w_3 |r(t_f)|,$$

wherein $t_f$ represents missile interception time, r represents a distance between the missile and a target, $w_1$, $w_2$ and $w_3$ are weighting factors, and $a_m$ represents a missile normal acceleration, and further $|r(t_f)| < r_{miss-allowed}$, where $r_{miss-allowed}$ represents a pre-selected allowable miss distance, wherein the minimization is performed by Tabu search;
      recording the optimized missile launch guidance law $f(z)$ in the non-transitory computer readable memory; and
      displaying the missile launch guidance law $f(z)$ to a user.

5. A computer software product that includes a non-transitory storage medium readable by a processor, the medium having stored thereon a set of instructions for generating an integrated fuzzy-based guidance law, the instructions comprising:
   a) a first sequence of instructions which, when executed by the processor, causes the processor to establish a missile guidance law $f(z)$, wherein z represents a vector containing fuzzy membership functions and guidance rules associated with the missile guidance law; and
   b) a second sequence of instructions which, when executed by the processor, causes the processor to optimize the missile launch guidance law $f(z)$ by minimizing the equation $$f(z) = w_1 t_f + w_2 \int_0^{t_f} a_m^2 dt + w_3 |r(t_f)|,$$

wherein $t_f$ represents missile interception time, r represents a distance between the missile and a target, $w_1$, $w_2$ and $w_3$ are weighting factors, and $a_m$ represents a missile normal acceleration, and further $|r(t_f)| < r_{miss-allowed}$, where $r_{miss-allowed}$ represents a pre-selected allowable miss distance, wherein the minimization is performed by Tabu search.

6. The computer software product as recited in claim 5, further comprising a third sequence of instructions which, when executed by the processor, causes the processor to display the optimized missile launch guidance law $f(z)$ to a user.

* * * * *